United States Patent [19]

Sandberg et al.

[11] 4,356,595

[45] Nov. 2, 1982

[54] METHOD AND APPARATUS FOR MOLDING FOOD PATTIES

[75] Inventors: Glenn A. Sandberg, Lockport; Wilbur Janssen; Duncan Bachmann, both of New Lenox, all of Ill.

[73] Assignee: Formax, Inc., Mokena, Ill.

[21] Appl. No.: 204,840

[22] Filed: Nov. 7, 1980

[51] Int. Cl.$^3$ ............................................... A22C 7/00
[52] U.S. Cl. ........................................ 17/45; 17/32; 425/557; 426/513
[58] Field of Search .................... 17/32; 426/512, 513, 426/516; 425/557

[56] References Cited

U.S. PATENT DOCUMENTS

| | | | |
|---|---|---|---|
| 3,887,964 | 6/1975 | Richards | 17/32 |
| 4,054,967 | 10/1977 | Sandberg et al. | 17/32 |
| 4,182,003 | 1/1980 | Lamartino et al. | 17/32 |
| 4,272,864 | 1/1981 | Holly | 17/45 |
| 4,276,318 | 6/1981 | Orlowski et al. | 426/513 |

*Primary Examiner*—Willie G. Abercrombie
*Attorney, Agent, or Firm*—Kinzer, Plyer, Dorn & McEachran

[57] ABSTRACT

A food patty molding method and apparatus, utilizing a cyclically driven mold plate containing one or more mold cavities, in which the fill passage connecting the food pump to the mold cavity has a cross sectional area, immediately adjacent the mold plate fill position, encompassing the entire mold cavity surface area; in one embodiment the fill passage comprises a multiplicity of orifices, and in another embodiment the fill passage is open and is matched to the mold cavity in size and configuration. In both embodiments the pressure on the food product is reduced to an intermediate level, a minor fraction of the fill pressure, during the transition interval when the mold cavity is moving away from the fill passage but still communicates therewith, following which the food product pressure is essentially relieved during the balance of the mold plate cycle until full fill pressure is required.

13 Claims, 9 Drawing Figures

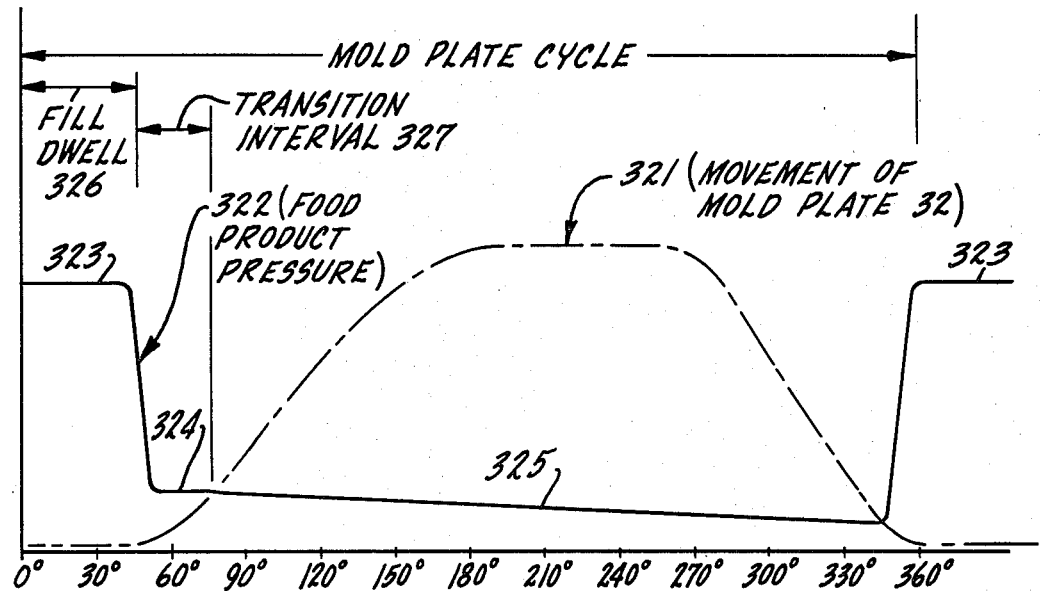
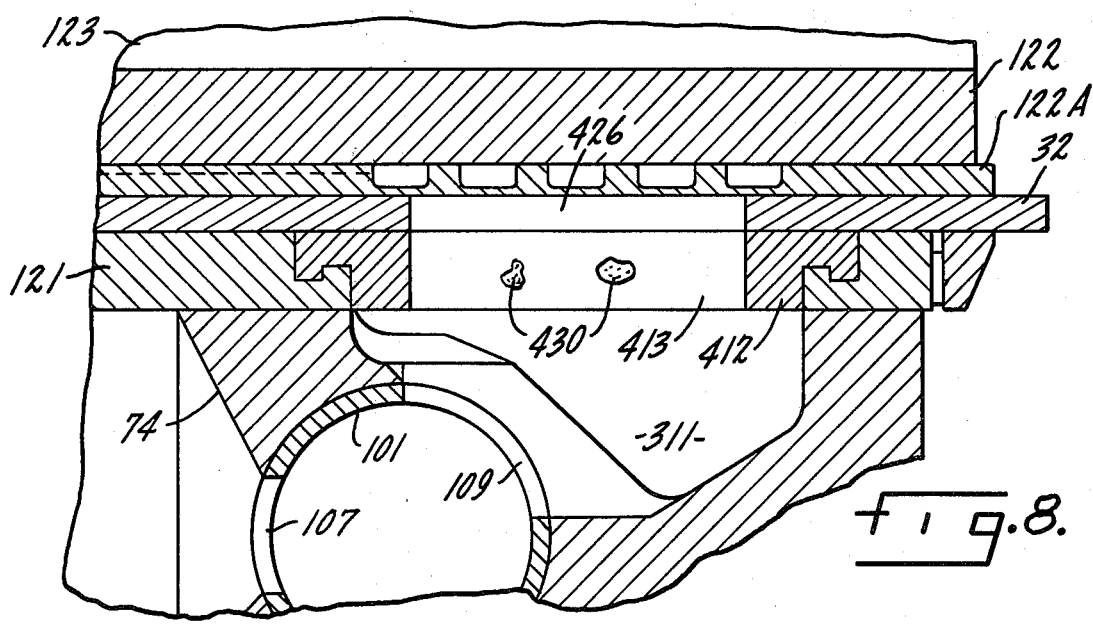
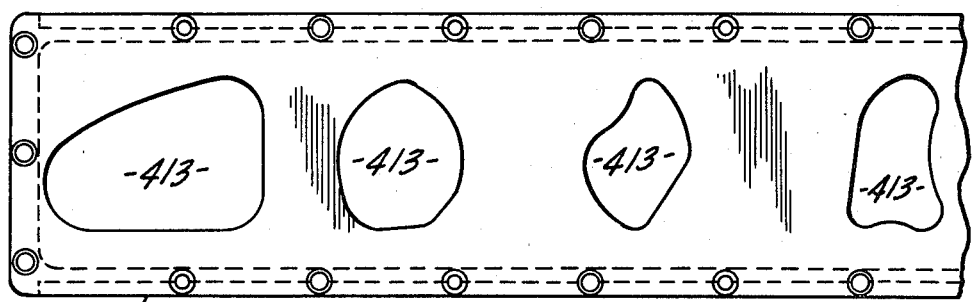

METHOD AND APPARATUS FOR MOLDING FOOD PATTIES

BACKGROUND OF THE INVENTION

Food patties of various kinds, including hamburgers, molded "steaks", fish cakes, chicken patties pork patties, potato patties, and others, are frequently formed in high-volume automated molding machines. Patty molding machines that can be adapted to any of these food products and that have proven quite successful are described in U.S. Pat. No. 3,887,964 to L. R. Richards, No. 4,054,967 to G. A. Sandberg et al, and No. 4,182,003 to LaMartino et al.

Although any of these machines, and others as well, are capable of producing food patties of consistent size, weight, and configuration on a high volume basis, substantial problems and difficulties still remain in some instances. Thus, in most patty molding machines it is quite difficult to duplicate the texture of hamburgers that are hand-molded. The machine-molded food patties frequently exhibit a tendency toward excess shrinkage when the patties are subsequently cooked. Another continuing problem pertains to distortion in the shape of the food patties, again occurring primarily when the patties are cooked.

Additional problems are encountered in high volume food patty molding machines when those machines are employed to process food product formulations, usually meat formulations, containing relatively large pieces. In this instance, the problems of distortion of shape, when the food patty is cooked, are often accentuated. If the configuration of the food patty is changed from the usual circular shape to some other configuration, as is often commercially desirable, it may be difficult to assure complete and consistent filling of the mold cavity. An additional problem is a tendency toward tearing and cutting of the large pieces in the food product in the course of the patty molding operation.

SUMMARY OF THE INVENTION

It is a principal object of the present invention, therefore, to provide a new and improved method and apparatus for molding food patties that effectively eliminates or minimizes the problems and difficulties described above without requiring a reduction in the speed of operation of a high-volume food patty molding machine and without requiring the addition of further moving parts in the molding mechanism.

A specific object of the invention is to provide a new and improved method and apparatus for molding food patties that permits the molding of patties having a uniform texture which exhibit minimal shrinkage when cooked and which hold their shape consistently when cooked.

Another object of the invention is to provide a new and improved method and apparatus for molding food patties that permits the molding of food product formulations containing large pieces into patties consistently conforming to the mold cavity configuration, with minimal deterioration of the large pieces and with no more than minimal distortion when the food patties' are cooked.

Accordingly, in one aspect the invention relates to an improved method of molding food patties comprising the following steps performed in a repeating mold cycle:

moving a mold plate having a mold cavity of given surface area from a fill position to a discharge position and back to the fill position, with a fill dwell interval at the fill position; and pumping a moldable food product into the mold cavity through a fill passage, under a given maximum fill pressure, during a portion of the mold plate cycle including the fill dwell interval.

The method improvement comprises:

providing a fill passage having a cross-sectional area, immediately adjacent to the mold plate fill position, effectively encompassing substantially the entire surface area of the mold cavity;

maintaining an intermediate pressure on the food product in the fill passage, comprising no more than a minor fraction of the fill pressure, during a major portion of the transition interval in each mold cycle in which the mold plate moves away from its fill position but a part of the mold cavity remains in communication with the fill passage;

and restricting the pressure on the food product in the fill passage to the intermediate pressure or less during the balance of the mold plate cycle, comprising at least about half of that cycle.

In another aspect, the invention relates to an improved food patty molding machine of the kind comprising:

a mold plate having a mold cavity of given surface area formed therein;

mold plate drive means for driving the mold plate, in a repeating cycle, from a fill position to a discharge position and back to the fill position, with a fill dwell interval at the fill position;

a variable pressure food pump for pumping a moldable food product;

a fill passage extending from the outlet of the food pump to the mold plate, the fill passage connecting the food pump outlet to the mold cavity when the mold plate is in its fill position;

and pump drive means for actuating the food pump in a cycle corresponding to the mold plate cycle, to apply a given maximum fill pressure to the food product in the fill passage, sufficient to fill the entire mold cavity, during a portion of the mold plate cycle including the fill dwell interval.

The machine improvement comprises:

the fill passage has a cross-sectional area, immediately adjacent to the mold plate fill position, effectively encompassing substantially the entire surface area of the mold cavity;

the pump drive means actuates the food pump to apply an intermediate pressure to the food product in the fill passage, comprising no more than a minor fraction of the fill pressure, during a major portion of the transition interval in each mold plate cycle in which the mold plate moves away from the fill position but a part of the mold cavity remains in communication with the fill passage;

and the pump drive means is effectively inactivated to limit the pressure on the food product in the fill passage during the balance of the mold plate cycle, comprising at least about half of that cycle.

BRIEF DESCRIPTION OF THE DRAWINGS

FIG. 6 is a chart showing variations in pressure on the food product in the course of a mold cycle, illustrating another feature of the present invention;

FIG. 8 is a sectional view, like FIGS. 2 and 3, illustrating another feature of the present invention; and FIG. 9 is a plan view of the fill passage insert employed in FIG. 8.

DESCRIPTION OF THE PREFERRED EMBODIMENTS

Figure 1:
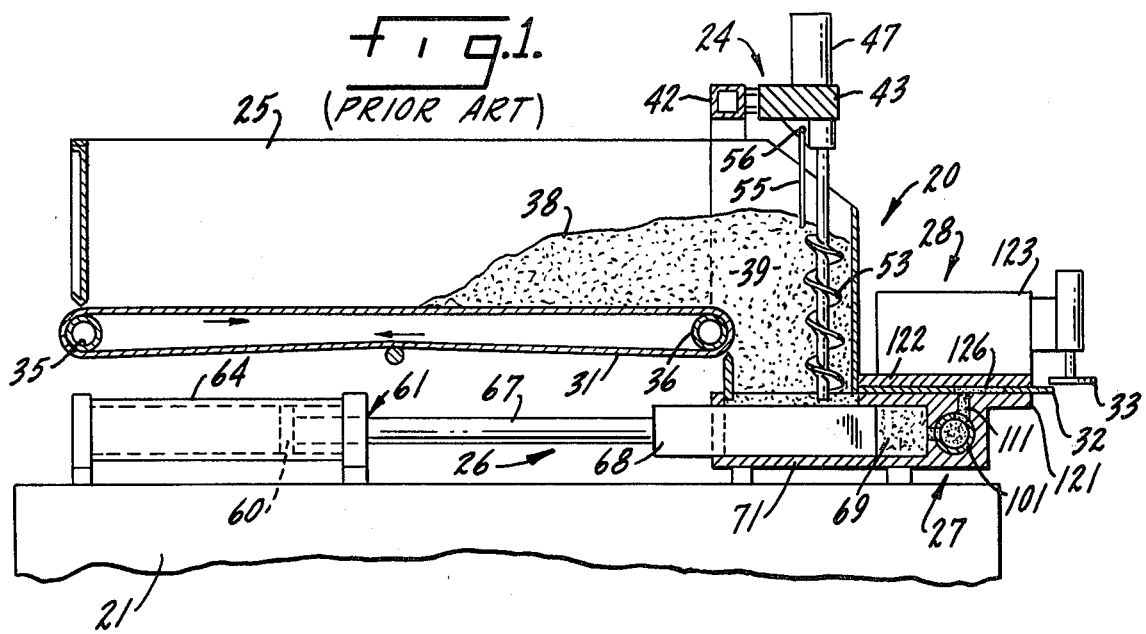
FIG. 1 is a sectional elevation view of a food patty molding machine of one type to which the present invention can be applied, specifically the molding machine of Richards U.S. Pat. No. 3,887,964.
Figure 2:
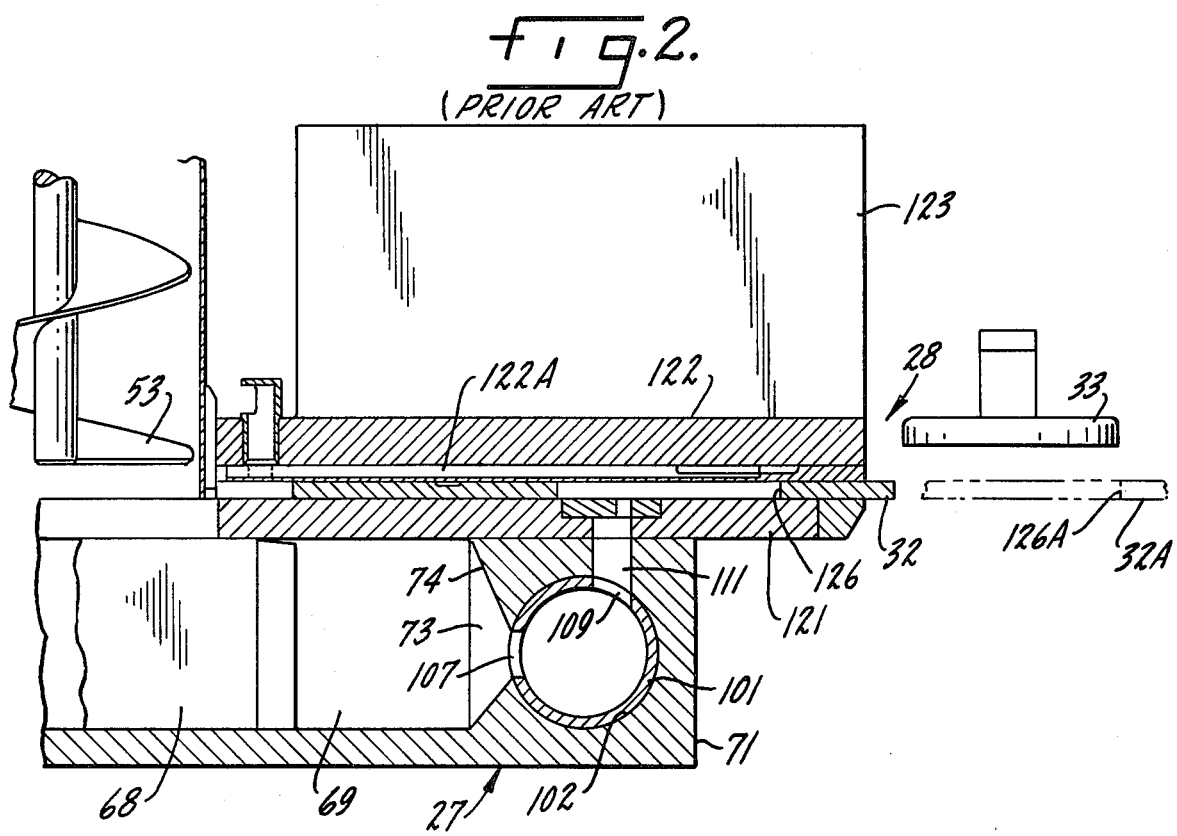
FIG. 2 is an enlarged sectional view of the molding mechanism previously used in the machine shown in FIG. 1.

FIGS. 1 and 2 illustrate a high volume food patty molding machine 20 of the type described in much greater detail in Richards U.S. Pat. No. 3,887,964, which machine has been marketed for several years as the Formax 26 machine by Formax, Inc. of Mokena, Ill. Molding machine 20 includes a machine base 21 which supports the operating mechanisms of the machine and contains hydraulic actuating systems, electrical actuating systems, and most of the machine controls.

The food patty molding machine 20 includes a supply means 24 for supplying a moldable food product, such as ground beef, fish, pork, chicken, potatoes, or the like, to the processing mechanisms of the machine. In some instances, as discussed more fully hereinafter, the food product may contain relatively large pieces, such as pieces of whole-muscle meat. Supply means 24 includes a large food product storage hopper 25 that opens into the intake of a food pump system 26. In this particular machine, the food pump system 26 includes two food pumps operating in alternation; other machines typically include only a single food pump.

The two food pumps of system 26 continuously pump food, under pressure, into a valve manifold 27 connected to a cyclically operable molding mechanism 28. Molding mechanism 28 includes a multi-cavity mold plate 32 that moves cyclically between a fill position, shown in FIGS. 1 and 2, and a discharge position in which the mold plate is aligned with a series of knock-out cups 33.

In addition to hopper 25, the food supply means 24 includes a conveyor belt 31 that extends completely across the bottom of the hopper, around a tensioning roller 35 and a drive roller 36. In FIG. 1, a limited supply of food product 38 is shown in hopper 25; a much greater supply could be stored in the hopper without exceeding its capacity.

The forward end of hopper 25 communicates with a vertical pump feed opening 39 that leads downwardly into two pump chambers; only one pump chamber 69 is shown. A frame 42 mounted on machine base 21 extends over the top of hopper 25, above the hopper outlet 39, and a bracket 43 affixed to frame 42 supports three motors for driving three downwardly vertically extending feed screws. Only one motor 47 and feed screw 53 are shown in the drawings.

A level sensing mechanism at the outlet end of hopper 25 comprises a sensing element 55 affixed to a shaft 56 that extends downwardly into the forward end of hopper 25. As food product moves forwardly in the hopper, it may accumulate to a level at which it engages sensor 55. When this occurs, shaft 56 is rotated and actuates a limit switch (not shown) to interrupt the drive for the conveyor drive roller 36. This makes it possible to maintain the accumulation of food product at a safe level at the outlet end 39 of food hopper 25.

In machine 20, FIGS. 1 and 2, as noted above, the food pump system 26 comprises two reciprocating food pumps; only one pump 61 is illustrated. Food pump 61 includes a hydraulic cylinder 64 having two ports 65 and 66. The piston 60 in cylinder 64 is connected to a piston rod 67 in turn connected to a large pump plunger 68. Plunger 68 is aligned with and extends into the pump cavity 69, which is formed by a pump cavity enclosure or housing 71. The forward wall 74 of pump cavity 69 includes a slot 73 that communicates with the pump manifold 27.

The pump feed manifold 27 includes a manifold valve cylinder 101 fitted into an opening 102 in housing 71 immediately beyond the pump cavity wall 74. Valve cylinder 101 includes two intake slots; only one of these intake slots 107 is illustrated. As shown in FIGS. 1 and 2, slot 107 is alignable with the outlet slot 73 in pump cavity wall 74, and this is the position employed when pump 61 is in use. Rotation of cylinder 101 is effective to move slot 107 out of alignment with slot 73 when the other pump of machine 20 is in operation. Valve cylinder 101 also includes an elongated outlet slot 109 aligned with a slot 111 in housing 71 that comprises a fill passage for the molding mechanism 28.

The upper part of the housing 71 for pump cavity 69 comprises a plate 121 that supports mold plate 32. Mold plate 32 includes a plurality of individual mold cavities 126 extending across the width of the mold plate; mold cavities 126 are alignable with the manifold outlet, fill passage 111, as shown in FIGS. 1 and 2. A breather plate 122A is disposed immediately above mold plate 32, and is itself covered by a mold cover 122, thus closing off the top of each of the mold cavities 126, and a housing 123 is positioned above cover plate 122. Suitable spacers (not shown) are provided between breather plate 122A and support plate 121 to maintain the spacing between those two plates essentially equal to the thickness of mold plate 32. Housing 123 encloses the operating mechanism (not shown) for knock-out cups 33.

In the operation of patty molding machine 20, a supply of ground meat or other moldable food product 38 is dumped into hopper 25 from overhead. The food product 38 is advanced toward hopper outlet 39 by conveyor 31. Whenever one of the plungers of the food pumps, such as the plunger 68 of food pump 61, is retracted to expose a pump cavity (e.g., cavity 69), the vertical feed screws such as feed screw 53 that are aligned with that pump cavity are actuated to feed the food product into the pump cavity.

In FIGS. 1 and 2, pumping system 26 is illustrated with mold plate 32 in its fill position and with pump 61 pumping the moldable food product into manifold 27. The second food pump of the machine, at this time, may be receiving a supply of the food product for a subsequent pumping operation. Pump 61, as shown, has just begun its pumping stroke, and has compressed the food product in pump cavity 69, forcing the food product through slot 73 and into manifold 27. As operation of machine 20 continues, plunger 68 advances as food product flows into the mold cavities through manifold 27, maintaining a relatively constant fill pressure on the remaining food product in chamber 69, manifold 27, and fill passage 111.

Ultimately, when the food product in pump cavity 69 is nearly exhausted, valve cylinder 101 is rotated to connect its intake to the outlet of the second food pump and to shut off its intake slot 107 from the outlet 73 of pump chamber 69. Thereafter, the second food pump is maintained in operation. The plunger 68 of food pump 61 is then retracted, by means of cylinder 64 and piston 60, to allow for refilling of pump cavity 69 with food product 38. Subsequently, when the second food pump requires refilling, a corresponding changeover occurs. In this manner, overlapping alternating operation of the two food pumps continues as long as molding machine 20 is in operation. Each time a pump changeover occurs, it is preceded by a rotation of valve cylinder 101 of manifold 27 to bring the new pump into operation before the refill cycle for the pump that has been in use is initiated.

In describing the operation of molding mechanism 28, and particularly mold plate 32, it is convenient to start with mold plate 32 in the fill position as shown in FIGS. 1 and 2. In each molding cycle, mold plate 32 remains in this fill position for a limited time interval. As the mold cavities 126 move into the fill position, one of the two food pumps of machine 20 pumps food product through manifold 27 and fill passage 111, filling the mold cavities. To assure complete filling of the mold cavities, the food pump must apply a substantial pressure to the food product. In the machine of FIGS. 1 and 2 the maximum fill pressure on the food product may be of the order of one hundred pounds per square inch, subject to variation in accordance with the requirements of the food product being molded into patties, the sizes of the mold plate cavities 126, and other related factors. In other machines, different fill pressures may be required.

Following the fill dwell interval, mold plate 32 is moved outwardly from the fill position shown in FIGS. 1 and 2 until it reaches a discharge position generally indicated by the phantom outline 32A in FIG. 2. With mold plate 32 in discharge position 32A, each of the mold cavities 126 is in a position 126A aligned with one of the knockout cups 33. A second dwell interval occurs at this point, during which the knockout cups 33 move downwardly through the mold cavities, discharging the molded food patties onto a takeoff conveyor (not shown).

Following discharge of the molded food patties, mold plate 32 is moved back toward the fill position so that mold cavities 126 can again be filled with food product. In this manner, food patties are molded at a rapid pace by machine 20; the commercial version of machine 20 normally operates at a rate of ninety molding cycles per minute. Inasmuch as there may be as many as six or more mold cavities in mold plate 32, it is seen that the output rate for machine 20 may be in excess of five hundred food patties per minute.

Figure 3:
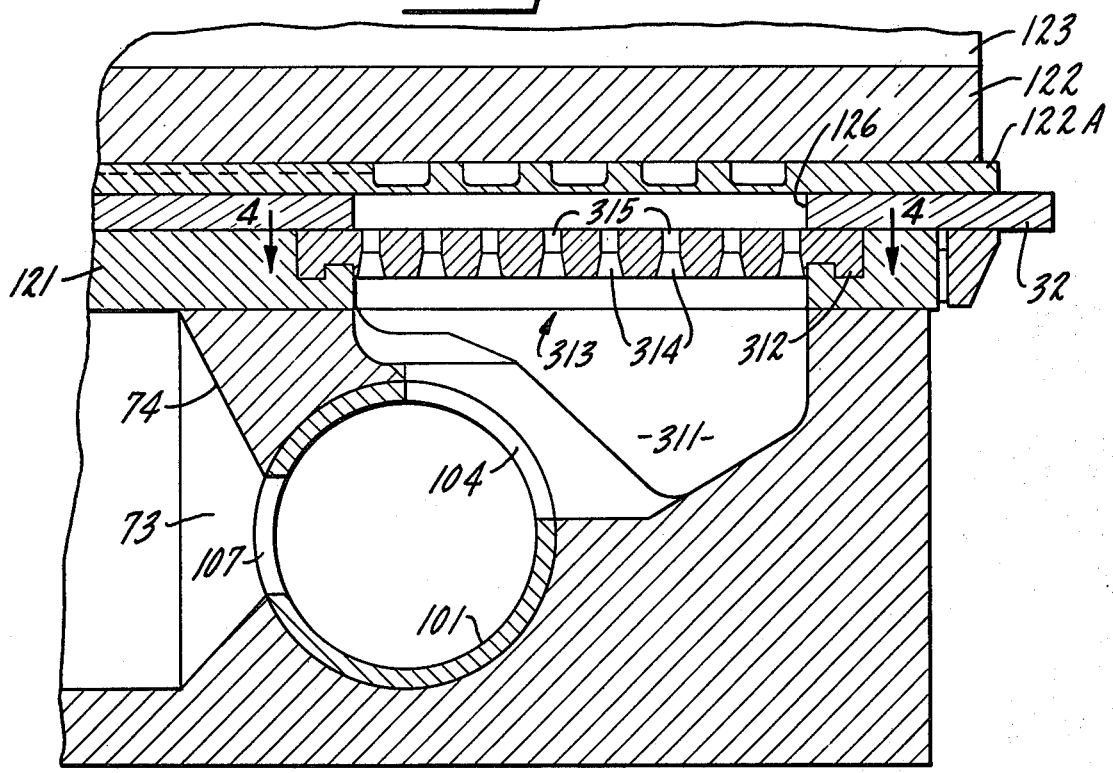
FIG. 3 is a sectional view, like FIG. 2, illustrating a modification of the machine of FIGS. 1 and 2 in accordance with one feature of the present invention.
Figure 4:
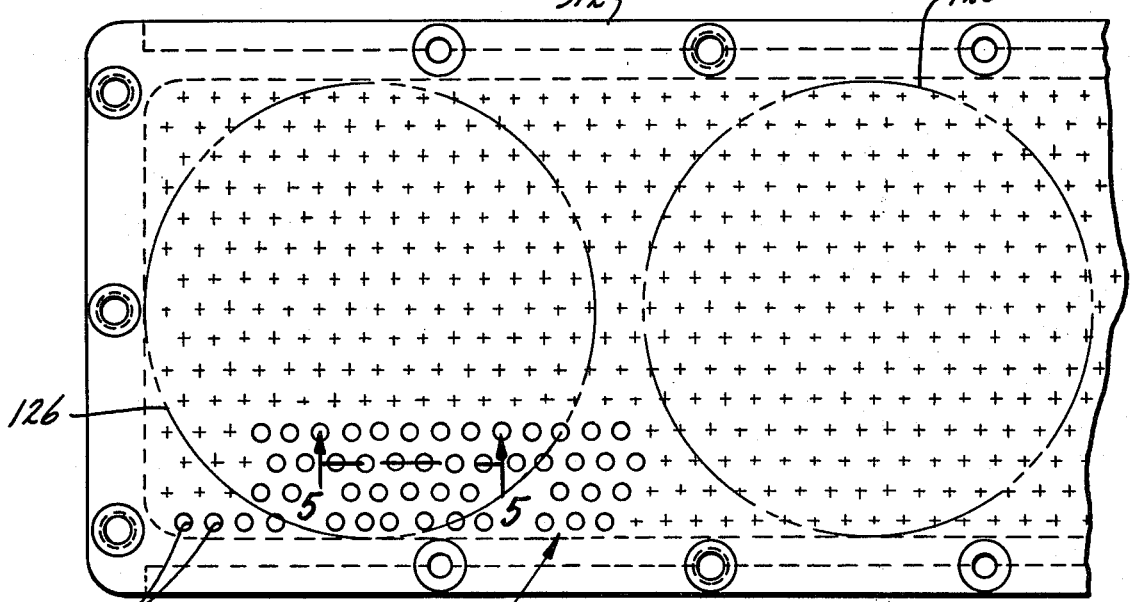
FIG. 4 is a plan view of a fill passage insert, taken approximately as indicated by line 4—4 in FIG. 3.
Figure 5:
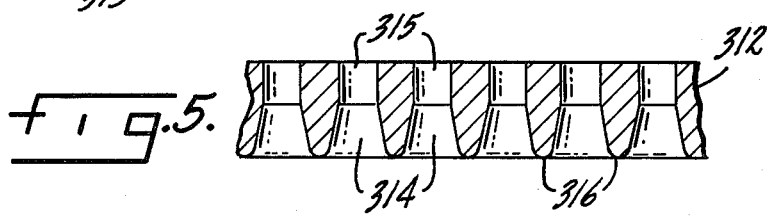
FIG. 5 is a detail sectional view of a fill passage insert taken approximately along line 4—4 in FIG. 4.

FIGS. 3, 4 and 5 illustrate a modification of the patty molding machine 20 that incorporates features of one embodiment of the present invention. One principal change is in the size of the fill passage 311 of the molding mechanism, as compared with the fill passage 111 in the conventional construction. Thus, as clearly shown in FIG. 3, the fill passage 311 is greatly enlarged, immediately adjacent to the mold plate 32, to the extent that the fill passage encompasses substantially the entire surface area of each of the mold cavities 126. This relationship is also generally shown in FIG. 4, which affords a plan view of an insert 312 that is interposed in the outlet end of fill passage 311 immediately adjacent mold plate 32. In FIG. 4, the surface areas of the mold cavities 126 are shown in phantom outline to illustrate the effective coverage of the mold cavity surface areas by the fill passage.

A multiplicity of closely spaced fill orifices 313 are distributed, preferably in staggered rows, throughout substantially the entire surface area of the fill passage insert 312. Consequently, these orifices 313 are distributed throughout the entire surface area of each of the mold cavities 126; see FIG. 4. The inlet portion 314 of each orifice 313 is of relatively large diameter; the outlet portion 315 of each orifice is preferably somewhat smaller. The inlet portions 314 of the orifices 313 facing toward fill passage 311 diverge. In a typical construction, the angle of divergence may be of the order of twenty degrees, but substantial variation is acceptable. The edges 316 of the fill passage insert 312 between the orifices 313 are rounded to limit buildup of food product there. It has been determined that rounding of the edges 316 permits continued operation of the patty machine over extended periods at substantially lower maximum fill pressures than required if sharp edges are present at the orifice inlets. The orifices 313 may be tapered, as shown; another acceptable construction is to utilize a straight outlet portion 315 merging into a diverging inlet portion 314 formed as a blend of radii.

The construction illustrated in FIGS. 3-5 has been found to be highly advantageous in the formation of hamburger patties and other molded food patties in several respects. With this multiple-orifice full area fill passage arrangement, the food product leaving the outlets 315 of the orifices 313 expands within each mold cavity 126, filling the mold cavity completely. However, the food product flows only a short distance in the mold cavity, much less than in the conventional arrangement of FIG. 2, and expands from a series of locations immediately adjacent the orifice outlets instead of from one location. The result, particularly when pressure conditions are controlled in the manner described hereinafter, is an improvement in the texture of the molded food patties; the texture is more like that of a hand-molded food patty than is realized with the conventional construction described above in connection with FIG. 2. Furthermore, the food patties tend to shrink less and hold their shape more consistently when cooked.

In the conventional patty molding machine of FIGS. 1 and 2, the pressure on the food product in pump cavity 69, manifold 27, and fill passage 111 is normally held at a high level, the level required for filling the mold cavities, during much of the molding cycle. Thus, each food pump serves to supply food product under pressure to the molding mechanism through a sequence of several mold plate cycles, without pressure relief. Furthermore, the second pump is brought into operation and maintains fill pressure continuously during pump changeover and during the next sequence of mold plate cycles.

The pattern of pressure application to the food product in the pump chamber and in the fill passage is somewhat different for other types of machines, particularly those in which there is a pump intake cycle during each cycle of operation of the mold plate, such as in LaMartino et al U.S. Pat. No. 4,182,003. In those machines, there is a reduction of pressure during a part of each mold plate cycle, while the pump chamber is being filled. Indeed, in such machines a limited vacuum may be produced in the pump chamber to aid in filling that chamber. Nevertheless, in any of these machines conventional practice has entailed the maintenance of high pressure on the food product in the fill passage for at least about half of the mold plate cycle, including the entire time that the mold cavity is moving into and away from the fill position but remains in communication with the fill passage. In general, it has been thought that this was necessary to assure effective operation of the molding machine.

One feature of the present invention is the discovery that the quality of the molded food patties can be improved by relieving the pressure on the food product in the pump cavity and in the fill passage throughout a substantial portion of the molding cycle. Specifically, and particularly in a molding machine in which a portion of the mold cavity may be exposed to the atmosphere while another portion remains in communication with a part of the fill passage, which is true of the mechanism shown in FIG. 3, it has been discovered that the quality of the molded food patties is materially improved if the pressure is relieved substantially (but not entirely) during the time interval in which the mold plate is moving away from its fill position but a part of the mold cavity remains in communication with the fill passage.

The preferred pressure relationship is illustrated in FIG. 6 as a function of the mold plate cycle timimg. In FIG. 6, the phantom line curve 321 shows the cyclic movement of mold plate 32. The solid line curve 322 illustrates the pressure that is applied to the food product in the fill passage of the machine.

As indicated in FIG. 6, a given maximum fill pressure 323 is preferably applied to the food product in the fill passage during the fill dwell interval 326 to assure filling of the entire mold cavity with the food product. Immediately following the fill dwell interval 326, however, in a succeeding transition interval 327 in which the mold plate is moving away from its fill position but a part of the mold cavity remains in communication with the fill passage, the pressure on the food product is reduced to an intermediate pressure 324 that is a minor fraction of the fill pressure 323. Typically, the intermediate pressure 324 may be approximately twenty percent of the fill pressure 323, though this value may vary to some extent depending upon the nature of the food product and the size and configuration of the mold cavities. The intermediate pressure 324 should be sufficient to preclude backflow of food product from the mold cavity into the fill passage during the transition interval 327. This requirement can be met by maintaining the intermediate pressure 324 in a range of about ten percent to fifty percent of the fill pressure 323 in most instances. In the Formax 26 machine, using a fill pressure of 110-150 psi, the intermediate pressure 324 is preferably in a range of about ten to seventy-five pounds per square inch; in other machines, of course, other values are likely to be required.

As also indicated in FIG. 6, in the preferred pressure relationship the pressure on the food product is relieved, during the remainder of the cycle, once the mold cavity has moved out of communication with the fill passage. Relief of pressure, in this situation, comprises avoidance of application of positive pumping effort to the food product; the actual pressure on the food product remains at or drops below the intermediate pressure 324. The pressure relief, indicated at 325, is preferably maintained through a major portion of the mold plate cycle. In any event, this condition should be maintained for at least about half of the mold plate cycle.

Figure 7:
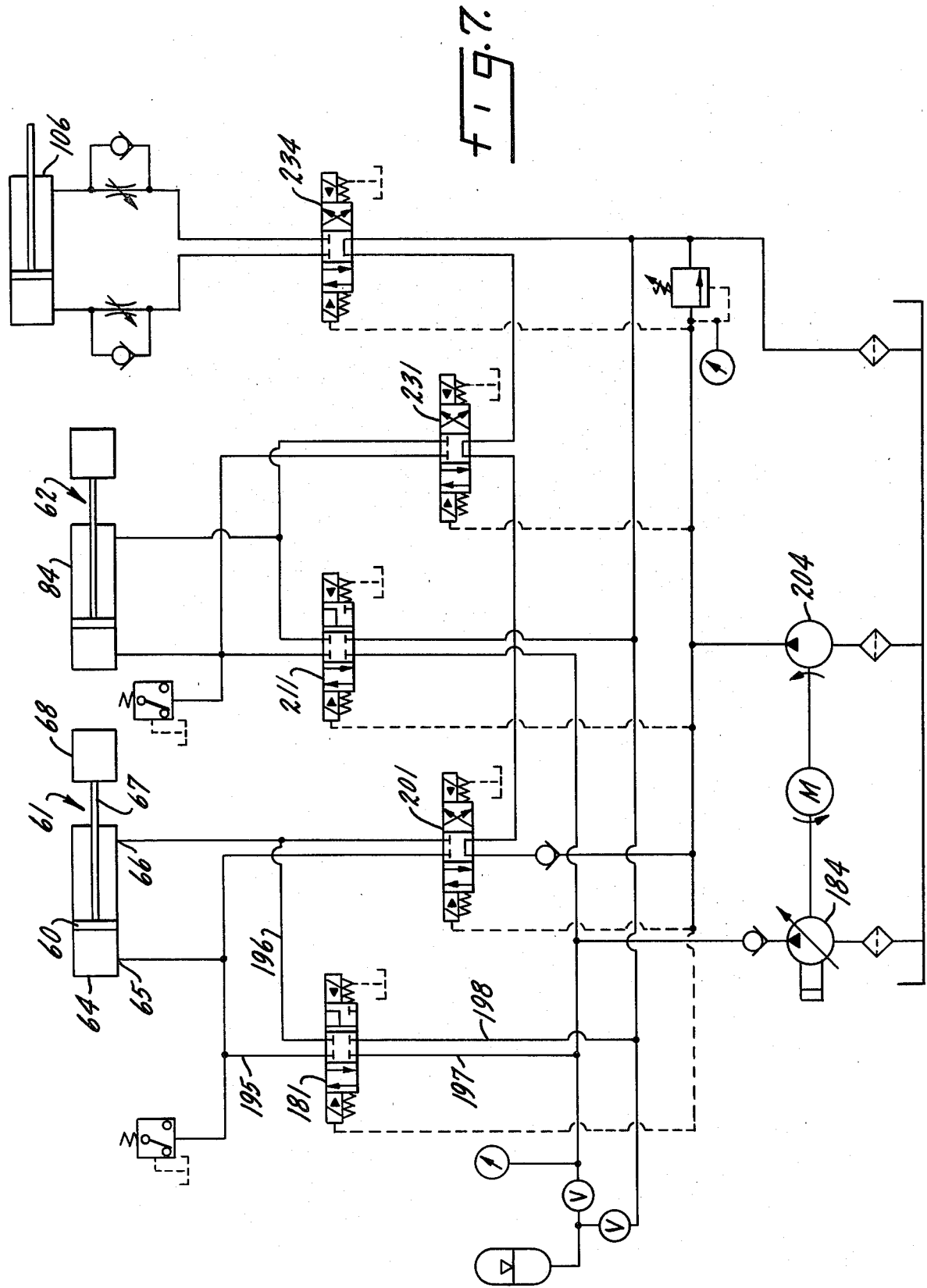
FIG. 7 is a schematic diagram of one form of hydraulic actuating system that may be employed in carrying out the present invention.

FIG. 7 affords a schematic diagram of a hydraulic pump drive for patty molding machine 20. The pump drive illustrated in FIG. 7 is the same as shown in FIG. 18 of the aforementioned Richards U.S. Pat. No. 3,887,964, with only two valves changed, and incorporates the same reference characters. Accordingly, reference may be made to the Richards patent for a detailed description of the operation of the pump drive in actuating the two food pumps 61 and 62 of the patty molding machine. The description here is limited to the valve changes introduced in order to provide a practical and effective means to obtain the intermediate pressure 324 and the "relieved" pressure 325 referred to above in connection with FIG. 6.

The only significant change in the hydraulic pump drive system of FIG. 7, as compared with the corresponding system shown in the Richards patent, is in the two control valves 181 and 211 that control actuation of the food pumps 61 and 62, supplying high pressure hydraulic fluid to the food pump cylinders 64 and 84 from the pump 184. In each of these valves 181 and 211, the right hand portion of the valve is modified to afford a connection that supplies fluid under equal pressures to the opposite sides of the food pump piston, e.g. piston 60. When this portion of either control valve is utilized, so that the pressure used for product forming is valved to both ends of the same food pump actuation cylinder, there is a resulting force in the food pumping direction because the presence of the piston rod (e.g., rod 67) reduces the effective piston area on the one side of the piston. That is, the total effective piston area is reduced to that of the cross sectional area of the piston rod. By controlling the relative diameters of the piston rod and the piston in each food pump cylinder, the desired intermediate pressure 324 (FIG. 6) can be readily and effectively obtained.

Relating the hydraulic pump drive system of FIG. 7 to the desired pressure-timing relationship illustrated in FIG. 6, as regards the operation of pump 61, at the beginning of the fill portion of the mold plate cycle control valve 181 is actuated to bring its left hand section into alignment with the hydraulic lines 195-198. This effectively connects pump 184 to cylinder 64 to apply the full pump pressure to port 65 of the cylinder, with port 66 connected to the system reservoir at atmospheric pressure. This causes cylinder 64 and piston 60 to actuate the food pump plunger 68 at the maximum fill pressure 323 (FIG. 6).

When the fill dwell interval ends and the mold plate begins to move toward its discharge position, valve 181 (FIG. 7) is actuated to shift the right hand portion of the valve into alignment with the hydraulic lines 195-198. This action connects the output of pump 184 to both of the ports 65 and 66 and establishes the conditions necessary for the intermediate pressure condition 324 (FIG. 6). This condition is maintained during the transition interval in which the mold cavities remain in communication with the fill passage. Upon completion of that time interval, valve 181 is returned to its normal position, as shown in FIG. 7, blocking access of pump 184 to cylinder 64. This provides the "relieved" pressure condition 325 desired for the balance of the mold plate cycle. The operation of valve 211 in controlling the application of the high pressure output from pump 184 to the second food pump cylinder 84 is the same. The valves 201 and 231, which control the retraction of the food pump plungers 68 and 88 and the initial advancing movement of the pumps plungers, with relatively low pressure fluid supplied by pump 204, remain unchanged in the operation from that described in the Richards patent. This is also true of the valve 234 and its operation of the cylinder 106 which controls manifold valve 101.

Of course, other pump drive arrangements can be utilized to obtain the desired intermediate pressure 324 (FIG. 6) in operation of the food pump or pumps of the patty molding machine. However, the simple hydraulic arrangement shown in FIG. 7 is most effective in this regard.

FIGS. 8 and 9 illustrate a modification of the patty molding mechanism incorporating the features of another embodiment of the invention. In this construction, the enlarged fill passage 311, effectively encompassing the entire surface area of mold plate 32, in which mold cavities may be formed, is again employed. In this instance, however, the mold plate incorporates a series of mold cavities 426 of irregular configuration. An insert 412 in plate 121 is provided with a series of fill passage openings 413; each fill passage opening 413 conforms closely to the surface area of one of the mold cavities 426 in both size and configuration. That is, each of the final fill passage openings 413 matches one of the mold cavities 426 in both size and configuration. The construction shown in FIGS. 8 and 9 is particularly advantageous when the molded food patty is to be formed from a food product containing relatively large pieces 430. These pieces 430 would not pass through a multi-orifice fill passage construction such as shown in FIG. 3. The construction of FIGS. 8 and 9, with the fill passages 413 matched to the mold cavities 426, assures effective filling of the mold cavities with a food product of this kind, so that uniform patty production can be maintained.

For effective operation of the modified patty molding mechanism shown in FIGS. 8 and 9, it has been found that the same pressure relationship shown in FIG. 6 for the previous embodiment should be maintained. This is particularly true in a construction, as shown in FIGS. 8 and 9, in which there is an interval in the mold plate cycle in which portions of the mold cavities 426 remain in communication with the fill passages 413 and other portions of the same mold cavities are already far enough out of the molding mechanism to be exposed to the atmosphere. By utilizing the enlarged matching fill passages 413 in conjunction with the relieved pressure features of the present invention, consistent formation of food patties of unusual configuration can be effectively achieved. Moreover, those food patties have improved texture, minimal shrinkage, and retain their shapes when cooked.

We claim:

1. A method of molding food patties comprising the following steps performed in a repeating mold cycle:
    moving a mold plate having a mold cavity of given surface area from a fill position to a discharge position and back to the fill position, with a fill dwell interval at the fill position;
    pumping a moldable food product from a food product supply directly into the mold cavity, under a given maximum fill pressure, through a fill passage having a cross-sectional area immediately adjacent to the mold plate fill position effectively encompassing substantially the entire surface area of the mold cavity, during a portion of the mold plate cycle including the fill dwell interval;
    maintaining an intermediate pressure on the food product in the fill passage, comprising no more than a minor fraction of the fill pressure, during a major portion of the transition interval in each mold cycle in which the mold plate moves away from its fill position but a part of the mold cavity remains in communication with the fill passage; and
    restricting the pressure on the food product in the fill passage to the intermediate pressure or less during the balance of the mold plate cycle, comprising at least about half of that cycle.

2. The method of molding food patties according to claim 1 in which the intermediate pressure is in a range of about ten percent to fifty percent of the fill pressure.

3. The method of molding food patties according to claim 1 in which the intermediate pressure is in the range of about ten to seventy-five pounds per square inch.

4. The method of molding food patties, according to claim 1, claim 2, or claim 3, in which the improvement further comprises limiting the fill passage, immediately adjacent to the mold plate fill position, to a multiplicity of closely spaced fill orifices distributed throughout substantially the entire surface area of the mold cavity.

5. The method of molding food patties, according to claim 1, claim 2, or claim 3, in which the improvement further comprises providing an unobstructed fill passage conforming approximately to the surface area of the mold cavity in both size and configuration.

6. A food patty molding machine of the kind comprising:
    a mold plate having a mold cavity of given surface area formed therein;
    mold plate drive means for driving the mold plate, in a repeating cycle, from a fill position to a discharge position and back to the fill position, with a fill dwell interval at the fill position;
    a food product supply for storing a moldable food product;
    a variable pressure food pump for pumping a moldable food product from the food product supply;
    a fill passage extending from the outlet of the food pump to the mold plate, the fill passage connecting the food pump outlet to the mold cavity when the mold plate is in its fill position, the fill passage having a cross-sectional area, immediately adjacent to the mold plate fill position, effectively encompassing substantially the entire surface area of the mold cavity;
    and pump drive means for actuating the food pump in a cycle corresponding to the mold plate cycle, to apply a given maximum fill pressure to the food product in the fill passage, sufficient to fill the entire mold cavity, during a portion of the mold plate cycle including the fill dwell interval;
    the pump drive means including means for limiting actuation of the food pump to apply an intermediate pressure to the food product in the fill passage, comprising no more than a minor fraction of the fill pressure, during a major portion of the transition interval in each mold plate cycle in which the mold plate moves away from the fill position but a part of the mold cavity remains in communication with the fill passage;

and the pump drive means further including means for effectively inactivating the pump to limit the pressure on the food product in the fill passage during the balance of the mold plate cycle, comprising at least about half of that cycle.

7. A food patty molding machine according to claim 6, in which the intermediate pressure is in a range of about ten percent to fifty percent of the fill pressure.

8. A food patty molding machine according to claim 6 in which the intermediate pressure is in the range of about ten to seventy-five pounds per square inch.

9. A food patty molding machine according to claim 6, claim 7, or claim 8, in which the fill passage conforms approximately to the surface area of the mold cavity in both size and configuration.

10. A food patty molding machine according to claim 6, claim 7, or claim 8, in which the fill passage comprises a multiplicity of closely spaced fill orifices distributed throughout substantially the entire surface area of the mold cavity.

11. A food patty molding machine according to claim 10 in which the portion of each fill orifice facing toward the food pump is of divergent configuration, and the edges of the orifice inlets are rounded to limit food product buildup at those edges.

12. A food patty molding machine according to claim 10 in which the fill passage conforms approximately to the surface area of the mold cavity in both size and configuration.

13. A food patty molding machine according to claim 12 in which the portion of each fill orifice facing toward the food pump is of divergent configuration, and the edges of the orifice inlets are rounded to limit food product buildup at those edges.

* * * * *